Dec. 23, 1958     D. L. FARMER     2,865,606
ROCK DRILL
Filed Aug. 13, 1956
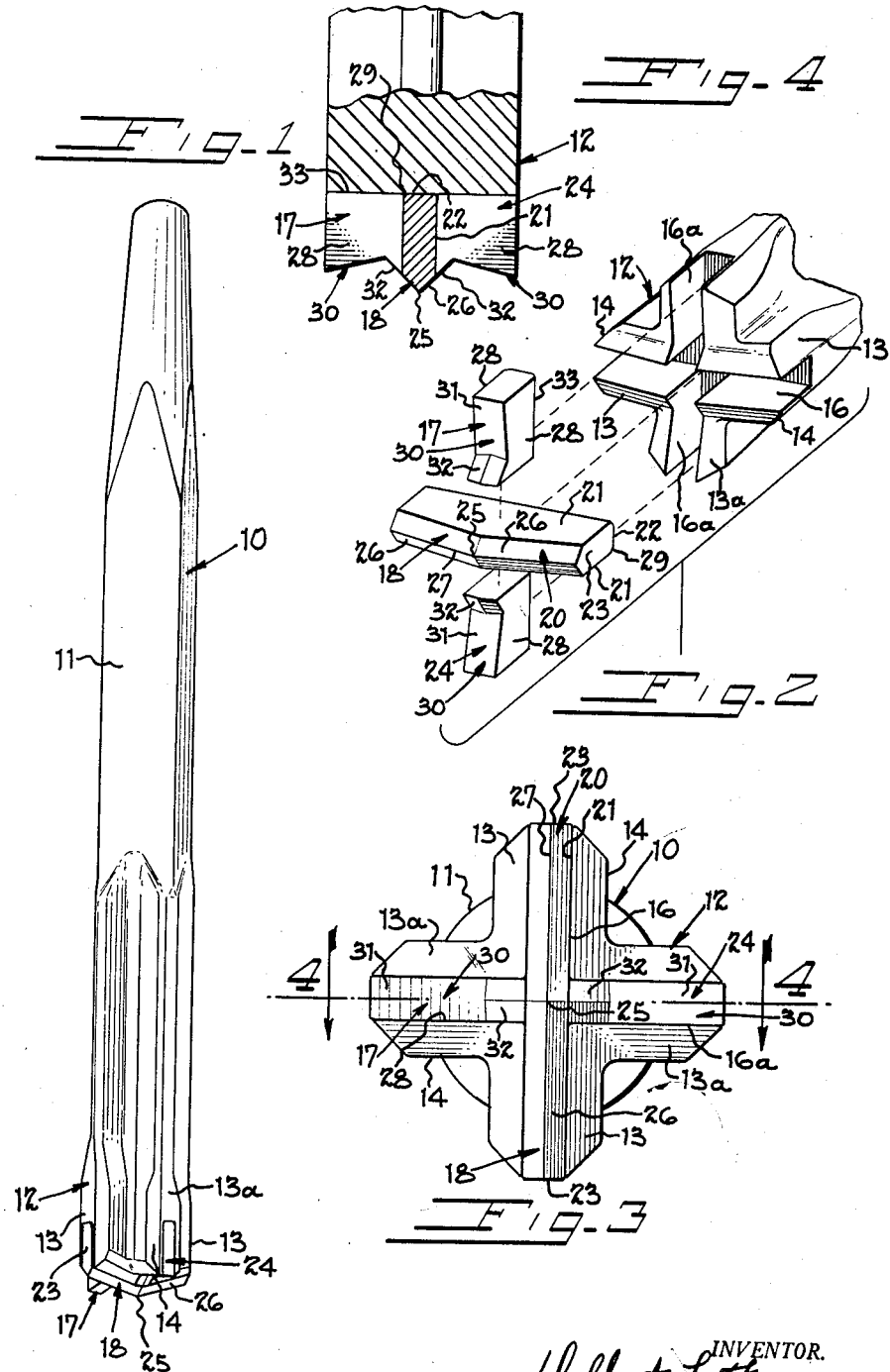

United States Patent Office 2,865,606
Patented Dec. 23, 1958

2,865,606

ROCK DRILL

Delbert Lewis Farmer, Norwood, Ohio, assignor to The Cincinnati Tool Company, Cincinnati, Ohio, a corporation of Ohio Application August 13, 1956, Serial No. 603,763

1 Claim. (Cl. 255—63)

This invention relates to drills and is particularly directed to an improved drill of the type used in conjunction with a pneumatic or electric hammer for drilling rock, concrete and the like.

The principal object of the present invention is to provide a rock, or masonry drill which is effective to cut through material at a high rate of speed and yet retain its sharp cutting edges over extremely long periods of time. In particular, the present drill is provided with cutting faces arranged in a manner generally similar to those of the drill shown in Hargrave Patent No. 1,881,535. Such a drill includes a main cutting tip, or chisel blade, extending diametrically across the cutting end of the drill; and two centering ribs, or lands, extending outwardly at right angles to the main cutting blade. The present invention contemplates the use of hard cutting inserts, preferably formed of tungsten carbide or the like, mounted in the cutting end of the drill. Consequently, the high cutting speed made possible by this particular arrangement of cutting edges is still further increased and the life of the cutting edges is lengthened many times; so that by using the present drill, a workman can drill a substantially greater number of holes in a day than was previously possible.

While the use of carbide tips in various types of drills has been common practice for several years, the provision of carbide inserts in a drill of the present type involves unique problems. In the first place, the present drill is adapted for use with a pneumatic or other impact hammer, the hammer forcing the drill into rock, or masonry, by means of a series of sharp blows. It will readily be appreciated that these impact blows strongly tend to loosen the carbide tips after a short period; and also tend to cause cracking in the inserts and abutting portions of the drill body.

Moreover, the present drill depends for its cutting action on relatively narrow cutting surfaces with extend completely across the drill and meet each other at substantially right angles. As explained below, the drill includes a chisel blade effective to make a series of slicing cuts across the diameter of the hole as the drill is progressively rotated following each hammer blow. In addition, the drill includes side or centering ribs which are also relatively narrow and extend perpendicular to the chisel blade, the centering ribs functioning to keep the drill centered within the hole so that the chisel blade is held in absolute diametric position relative to the hole being drilled.

The present invention is predicated upon the empirical determination and discovery that the particular carbide insert construction disclosed herein prevents the tips from becoming loosened and also prevents the drill body and tips from cracking so that the drill can be used for extremely long periods of time without need for repair.

A preferred form of drill constructed in accordance with the present invention comprises a body including a shank portion, and two diametrically opposed chisel supporting ribs tapering outwardly toward the end of the drill. The cutting end of the drill also includes two diametrically opposed centering ribs tapering inwardly toward the center of the drill, and disposed at right angles to the chisel supporting ribs. A first slot is milled diametrically across the face of the drill through the chisel supporting ribs; and a second slot is milled across the drill through the centering ribs. A single chisel blade formed of carbide or the like is placed within the first slot and two centering, or sizing inserts are placed in the slots in the centering ribs. The inner ends of these centering inserts reside in abutment with the chisel blade. The outer ends of each of the centering inserts taper inwardly in the same manner as the centering ribs, while the innermost portions of the tips extend outwardly in substantial parallelism with the beveled cutting edges of the chisel blade. The chisel blade and centering blades are joined together and to the main drill body by means of a suitable brazing compound. It has been determined that a drill of this construction is highly advantageous in that it not only possesses a very high cutting speed, but is extremely durable in use. One of the features of construction which greatly increases the durability of the drill is that the chisel blade, which performs most of the cutting, is made from a single piece of tungsten carbide.

The present drill construction is also extremely advantageous since it can be readily and economically manufactured without substantially increasing the cost over drills of the same type not having carbide tips. In accordance with the present invention, the drill shank and ribs are forged in the usual manner. Thereafter, two slots are milled across the end of the drill at right angles to one another and the preformed carbide inserts and suitable brazing compound are placed within the slots and heated to complete the assembly.

These, and other objects and advantages of the present invention will be more readily apparent from a consideration of the following detailed description of the drawings illustrating a preferred embodiment of the invention.

In the drawings:

Figure 1 is a front elevational view of a drill;

Figure 2 is an exploded view of the cutting end of the drill with the carbide inserts removed therefrom;

Figure 3 is an end view of the drill; and

Figure 4 is a cross-sectional view taken along line 4—4 of Figure 3.

As shown in Figure 1, a drill 10 constructed in accordance with the present invention comprises an elongated body or shank 11 preferably formed of square stock, although round, octagonal or other suitable stock can be employed if desired. An enlarged cutting end 12 is formed on one end of the body; this cutting end is configurated to form four radially extending ribs 13 and 13a. As best shown in Figures 1 and 3, each of these ribs includes a thickened endwise portion 14, the endwise portions flaring slightly outwardly from the body to provide clearance along the ribs for facilitating chip removal.

Chisel blade supporting ribs 13 are diametrically disposed relative to one another and taper outwardly toward the center of the drill a slight amount, for example, twelve degrees. Ribs 13a extend diametrically across the drill at right angles to ribs 13 and are tapered inwardly a similar amount. The combined width of ribs 13 is equal to the combined width of ribs 13a so that the drill is accurately centered within the hole being drilled. A first groove 16 is milled or otherwise cut completely across the end of the drill through ribs 13 and a second groove 16a is milled at right angles to the first groove through ribs 13a. The thickened portion 14 of the ribs provides reinforcement along the sides of the grooves.

A main insert or chisel blade 18 formed of a hard wear resistant metal such as tungsten carbide is disposed with groove 16 formed in ribs 13. This carbide insert is relatively thin and includes flat side faces 21 and a flat backup, or rear, face 22. The edges joining side faces 21 and rear face 22 are preferably beveled as at 29 to prevent chipping of the insert and drill body at this point. The outer or cutting face 20 of insert 18 tapers to a chisel point 25 formed midway between the two ends 23 of the insert. It will be appreciated that the longitudinal taper along the faces of this tip is preferably the same as the corresponding taper on ribs 13. Additionally, the outer face of carbide tip 18 is beveled to form cutting faces 26 meeting at right angles to define a cutting edge 27.

Centering inserts 17 and 24 are also formed of tungsten carbide or the like. These inserts are identical with one another, each including flat side faces 28 and a rear or backup face 33. The lines of juncture of the side and rear faces are beveled to prevent chipping as explained above. Each centering insert further includes a generally V-shaped cutting edge 30 having an inwardly tapering surface 31 corresponding to the inward taper of ribs 13a and an outwardly extending tip 32 forming, in effect, a continuation of face 26 of the center insert 18 when the centering insert abuts a side wall of chisel blade 18.

In assembling the drill, the drill body and ribs are forged in the usual manner and slots 16 and 16a are milled completely across the cutting end of the drill through ribs 13 and 13a respectively. Thereafter a preformed chisel blade 18 is inserted in slot 16 and preformed centering inserts 17 and 24 are inserted in slot 16a, together with a suitable brazing compound. The drill is then heated to braze the inserts in place.

In use, the shank is inserted in any suitable impact drill. The hammer blows of the drill force chisel blade 18 into the rock, brick, masonry or other material being cut. The drill is rotated slightly between each blow so that the chisel blade takes a slicing cut across the full diameter of the hole, the diametric cuts progressing gradually around the circle. The centering inserts which taper inwardly do not interfere in any manner with the shearing away with the material at the bottom of the hole. However, the outer edges of these inserts, engage the periphery of the hole maintaining chisel blade 18 on a true diameter; and additionally, the centering ribs and inserts provide a cutting action along the sides of the hole being drilled.

If after protracted periods of use the cutting edge should become dull, the present drill can readily be sharpened by bringing the chisel blade into engagement with a suitable grinding wheel, the grinding wheel simultaneously sharpening the adjacent tips of the centering inserts.

Having described my invention I claim:

As a new article of manufacture, a rock drill of the impact type comprising a forged body having a cutting end formed at the lower end thereof, said cutting end being configured to form a first pair of ribs extending radially from the body along a first diameter, a second pair of ribs extending radially from the body along a second diameter perpendicular to the first diameter, said first ribs having endwise faces tapering downwardly from the periphery of the drill toward the axis of the drill, the second pair of ribs having endwise faces tapering upwardly from the periphery of the drill toward the axis of the drill, the cutting end of said drill being provided with a first slot extending across said first diameter, a second slot extending across said second diameter, a hard metal chisel blade disposed within said first slot and extending completely across said first ribs, said chisel blade having a cutting surface tapering downwardly from the periphery toward the axis of the drill to define a chisel point at said lower end, said cutting surface being beveled to define a cutting edge extending lengthwise of said chisel blade, hard metal centering inserts disposed within said second slot on opposite sides of said chisel blade and extending to the ends of said second ribs, each of said centering inserts having a cutting face having two portions, a first portion tapering upwardly from the periphery of the drill toward the axis thereof, and a second portion intercepting the first portion and tapering downwardly from said first portion toward the axis of the drill, the second portion of said cutting face being downwardly develed to define a cutting edge, and said beveled cutting edge of the second portions of said centering inserts and the chisel point of said chisel blade formed by its downward taper, being aligned to form a continuous cutting edge at right angles to the cutting edge of said chisel blade, and brazing means for joining said chisel blade and said inserts to said body.

References Cited in the file of this patent

UNITED STATES PATENTS

| 1,881,535 | Hargrave | Oct. 11, 1932 |
| 2,673,716 | Avery | Mar. 30, 1954 |

FOREIGN PATENTS

| 637,237 | Great Britain | May 17, 1950 |
| 919,402 | Germany | Oct. 21, 1954 |